Feb. 21, 1950     T. WEBER     2,498,320
PERCUSSIVE TYPE FENDER AND BODY SHAPING HAND-TOOL
Filed May 27, 1946
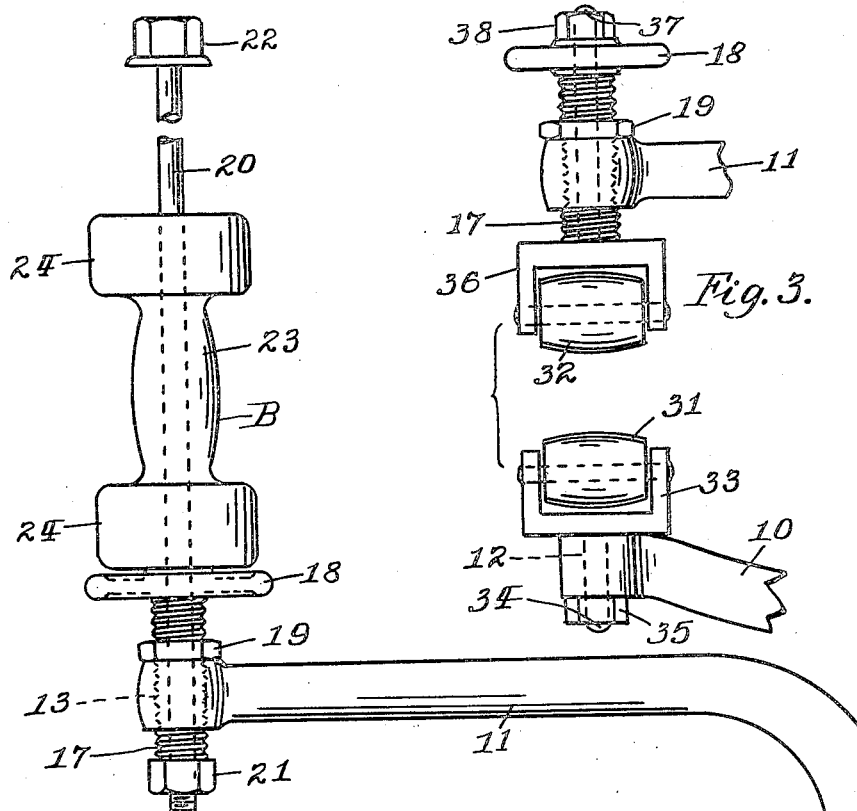
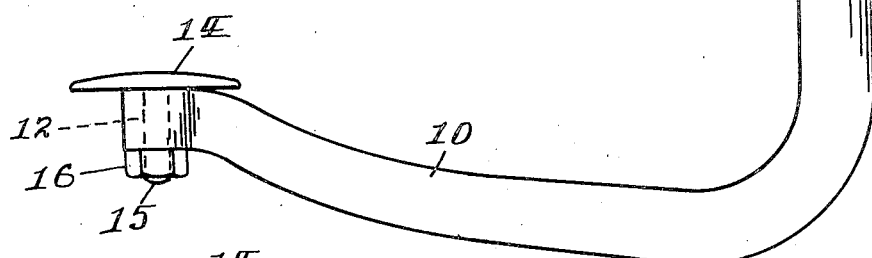
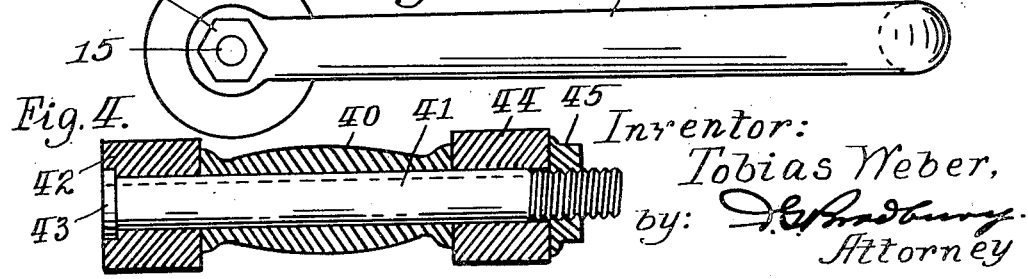
Inventor:
Tobias Weber,
by: [signature]
Attorney Patented Feb. 21, 1950

2,498,320

UNITED STATES PATENT OFFICE 2,498,320

PERCUSSIVE TYPE FENDER AND BODY SHAPING HAND TOOL

Tobias Weber, Los Angeles, Calif.

Application May 27, 1946, Serial No. 672,488

2 Claims. (Cl. 81—15)

My invention relates to a metal working tool which is employed for removing dents, bulges and the defacements from metal such as is used for fenders, panels and bodies of vehicles and other uses.

The primary object of the invention is to provide a reshaping tool which is capable of ironing out straight, curved and irregular shaped surfaces of comparatively thin or thick sheet metal in vehicle structures and in places which are difficult or easy to reach. Among other objects are maximum simplicity and strength of construction and effectiveness in use.

A particular feature of the invention is the unique application of a hammer element to a yoke by which the outward force of a blow is converted into the outward force of a forming iron, when the latter is applied to an inner work surface.

In the accompanying drawing forming part of this specification, Fig. 1 is a side elevation of my improved metal working tool; Fig. 2 is a view looking at the bottom of the structure shown in Fig. 1; Fig. 3 is a side elevation of a detail illustrating the application of ironing rollers to my improved metal working tool, and Fig. 4 is a longitudinal section of an alternative construction of the hammer.

Referring to Figs. 1 and 2 A represents a yoke made out of heavy tubing or structural metal of various reinforcing cross sectional designs to provide light weight and maximum strength and rigidity of construction. The yoke has a pair of extended complementary work arms 10 and 11 of sufficient length extending laterally in substantially corresponding direction and spaced apart sufficiently to permit being inserted on opposite sides of the surface area of the sheet metal to be reshaped. The arms may be of various lengths and shapes to reach and accommodate various types of repairing and reshaping of fenders, panels and body parts of vehicles, etc.

One of the arms such as 10 has a transverse socket 12 through its outer end portion and the companion arm 11 has a corresponding transverse socket 13 in its extended end portion, said sockets being preferably although not necessarily substantially coaxial. A sheet metal shaping iron having a head 14 of suitable size, shape and design and a stem 15 which latter is secured through the socket 12 by the nut 16 or other suitable means. The opposite socket 13 is internally threaded and an adjustable sleeve 17 is threadedly engaged therethrough. A circular handle 18 integral with an end portion of the sleeve enables the sleeve to be rotated by hand and thus adjusted lengthwise. A lock nut 19 engaged on the sleeve permits the latter to be locked on the arm 11 of the yoke in fixed adjusted position. An impact transmitting guide shaft 20 is slidably retained through the sleeve by the nut 21. The extended opposite end of the shaft has a stop 22. Freely slidable on shaft 20 as a guide is an impact hammer B which when reciprocated by hand on rod 20 strikes the stop 22 with a sharp blow. The shaft is extended coaxially with the sockets 12 and 13 and the force of the blow delivered by the hammer is transmitted through shaft 20 and yoke A to the shaping and smoothing iron 14. In this manner the outward thrust effort delivered by the momentum of the hammer is transmitted in the same direction to the shaping and smoothing iron so as to reform or straighten any deformed surface against which the surface of said forming iron is impressed. Sheet metal surfaces to which the shaping or smoothing iron is applied can thus be quickly and effectively reformed and evenly smoothed without leaving any blemish.

The impact hammer is of any suitable weight whereby it is adapted to deliver by its momentum a sharp impact blow against the stop when reciprocated and is adapted to be reciprocated back and forth by hand a suitable number of times to cause the forming iron to completely smooth out any blemish in the sheet metal surface to which the device is applied. As shown the hammer has a hand grip 23 between a pair of enlarged end portions 24, which increase the weight of the hammer so that sharp impact blows are delivered against the handle 18 and stop 22, when the hammer is reciprocated longitudinally.

It is contemplated that the impact hammer can be easily changed and substituted by a hammer of any suitable weight. It is contemplated that the hammer may be composed of sectional parts to change weight, Fig. 4 illustrating two separate weight end portions 42 and 44 and an intermediate hand grip 40 removably mounted on a tubular core 41 and held against a stop 43 on one end of the core and a nut 45 threaded on the opposite end portion. The tubular core is adapted to reciprocate freely on the guide rod 20 in the same manner as the impact hammer B.

The yoke can easily be converted for use in the ordinary manner for ironing out any defect in sheet material by the use of a pair of ironing rollers such as 31 and 32, as shown in Fig. 3. One roller 31 is freely journaled in a forked support 33 which has a stem 34 removably secured by the nut 35 through the socket 12 in arm 10. The corresponding roller 32 is freely journaled in the forked support 36 which has a threaded stem 37 secured through the passage in the adjustable threaded sleeve 17 by the nut 38. In use the lock nut 19 is loosened and the sleeve is adjusted lengthwise by regulating the handle 18 whereby sufficient pressure is applied in cooperation with the companion roller 31 to gradually iron and smooth out any creases or shapes in sheet metal to a finished degree of smoothness.

Modifications and changes in construction are contemplated within the spirit of the invention and within the scope of the following claims.

I claim:

1. A fender and body shaping tool, comprising a yoke having complementary arms with sockets in their outer portions, a forming iron seated inwardly in one of said sockets, a sleeve threaded through the opposite socket and having a handle on its outer end by which the sleeve can be revolved and adjusted, a guide shaft retained through and extended from the sleeve and having a stop on its outer end, and a hammer freely reciprocable on said shaft between said stop and handle, the stroke of said hammer being regulated by the adjustment of said sleeve.

2. In a structure as defined in claim 1, the hammer comprising a tube freely slidable on the shaft, and sections of different weight removably secured on said tube to vary the total weight of the hammer.

TOBIAS WEBER.

REFERENCES CITED

The following references are of record in the file of this patent:

UNITED STATES PATENTS

| Number | Name | Date |
|---|---|---|
| 1,737,646 | Cummings | Dec. 3, 1929 |
| 1,903,548 | Kreis | Apr. 11, 1933 |
| 2,178,308 | Newman | Oct. 31, 1939 |